3,184,435
POLYURETHANES CONTAINING A NORBOR-
NANE [NORCAMPHANE] NUCLEUS
John R. Caldwell and Winston J. Jackson, Jr., Kingsport, Tenn., assignors to Eastman Kodak Company, Rochester, N.Y., a corporation of New Jersey
No Drawing. Filed Nov. 13, 1962, Ser. No. 237,314
6 Claims. (Cl. 260—77.5)

This invention relates to a new class of high molecular weight linear polymers useful in the production of moldable plastic products and films as well as fibers, filaments and yarns and more particularly to novel polyurethanes containing a norbornane ring and characterized by an unusual degree of hardness as compared to polyurethanes of the prior art.

Many polyurethanes have been previously reported and certain of these compositions have been found suitable for the production of various products such as fibers, filaments, yarns and various plastic products. Such compositions are described, for example, in U.S. Patents 2,660,574 and 2,660,575. However, such polyurethanes have been found to be defective for certain practical applications, particularly in the production of molded products and films because of the fact that they are lacking in the required degree of hardness with the result that products produced therefrom display a tendency toward scratching, scuffing, and denting when subjected to contact with roughened surfaces or the impact of metallic and other hard objects. This has seriously lessened their usefulness, particularly in the field of molding.

This invention has as an object to provide a new class of polyurethanes useful in the production of moldable plastic products and films and in the production of fibers, filaments and yarns.

Another object is to provide a class of polyurethanes which have an unusual degree of surface hardness as compared to known polyurethane moldable and film-forming compositions, and characterized by a high degree of resistance to scratching, scuffing, denting and the like.

Other objects will appear hereinafter.

These objects are accomplished by the following invention which is based upon the surprising discovery that a polyurethane containing a norbornane ring has an unusual degree of hardness and effectively resists scratching, scuffing, denting and other adverse effects when products produced therefrom are subjected to surface friction by roughened surfaces of various kinds and to denting upon the impact of metallic and other hard objects thereon. More specifically, the new class of polyurethanes of the present invention are prepared by reaction of 2,5 (or 2,6)-norbornanebis(methylamine) and bischloroformates of diols. This diamine is described in U.S. Patent 2,666,748 (Example 25). In forming these new polymers a bischloroformate of a diol dissolved in a water-immiscible solvent is added to a rapidly stirred aqueous mixture of the diamine, sodium carbonate and an emulsifying agent. The polymer precipitates almost immediately and the repeating units thereof may be represented by the structural formula:

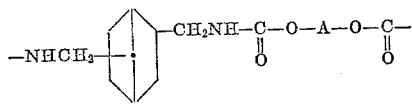

wherein A is a radical selected from the group consisting of the divalent straight-chain alkylene radicals of 2–20 carbon atoms, the divalent branched-chain alkylene radicals of 2–20 carbon atoms, phenylene, xylylene, and the divalent alicyclic radicals selected from the group consisting of cyclohexylene, cyclohexylenedimethylene, norbornylene and norbornylenedimethylene and 2,2,4,4-tetramethylcyclobutylene.

The diol from which the bischloroformate is prepared may be aliphatic, aryl aliphatic, aromatic or alicyclic and may be a primary or secondary. Examples of aliphatic diols are ethylene glycol, 1,6-hexanediol, 2,2-dimethylpropanediol and 1,10-decanediol; examples of aryl aliphatic diols are p-xylene-α,α'-diol and m-xylene-α,α'-diol; examples of aromatic diols are hydroquinone and 2,5-dimethylhydroquinone; examples of alicyclic diols are 1,4-cyclohexanediol, 1,4-cyclohexanedimethanol, 2,5-norbornanediol, 2,5-norbornanedimethanol and 2,2,4,4-tetramethyl-1,3-cyclobutanediol.

The bischloroformates are prepared by adding an excess of phosgene to the diol suspended in ethylene dichloride. If the diol reacts very slowly, a little dry dioxane is also added to increase its solubility in the medium. After all of the diol has gone into solution, dry air is bubbled in until all hydrogen chloride and excess phosgene have been swept out. The bischloroformate solution is then used as needed in the polymerization reactions. Other solvents for the bischloroformate are methylene chloride, benzene and toluene.

The novel polyurethane compositions of our invention may be prepared by a process which is similar to known processes for the preparation of polyurethanes, as, for example, the processes described in U.S. Patent 2,731,446 and British Patent 685,729. The specific reaction by which these novel compositions are prepared may be illustrated by the following equation:

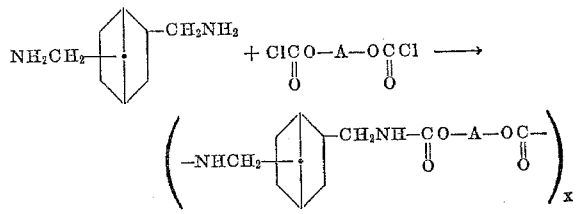

wherein A is a radical as defined above.

As indicated above a bischloroformate of a diol dissolved in a water-immiscible solvent is added to a rapidly stirred aqueous mixture of the diamine, sodium carbonate and emulsifying agent.

An equivalent amount of diamine, or preferably, a slight excess of diamine over the bischloroformate is employed. Sodium bicarbonate, sodium hydroxide, calcium oxide, etc., may be substituted for the sodium carbonate, which is preferred.

Satisfactory water-immiscible solvents are ethylene, dichloride, methylene chloride, benzene and toluene. A suitable emulsifying agent is sodium lauryl sulfate although many other known emulsifying agents may also be employed. Since the polymerization reaction is exothermic, it is preferable to cool the alkaline mixture in an ice-water bath before addition of the bischloroformate solution.

In the following examples and description we have set forth several of the preferred embodiments of our invention but they are included merely for purposes of illustration and not as a limitation thereof.

All inherent viscosities were measured in 60/40 phenol/tetrachloroethane.

*Example 1*

A mixture containing 10.6 g. (0.10 mole) of sodium carbonate, 15 ml. of water, 6.5 g. (0.042 mole) of 2,5 (or 2,6)-norbornanebis(methylamine), and 0.7 g. of sodium lauryl sulfate (emulsifying agent) was cooled in an ice-water bath. While the mixture was rapidly stirred, 40.0 ml. of an ethylene dichloride solution containing 0.040 mole of 1,4-cyclohexanedimethanol bischloroformate was added. The polyurethane precipitated almost immediately. After the mixture was stirred for 10 min., the polymer was collected, washed by stirring with water, and dried. It melted at 180–190° C. and had an inherent viscosity of 0.62.

The polyurethane product could be formed into various molded products by any of the standard molding processes such as injection molding and the like. A sample of the material was pressed into the form of a sheet 0.003 inch in thickness and was found to have a hardness index of 3H–2H when subjected to the so-called Kohinoor hardness test as described in the ASTM Bulletin No. 145, March 1947, page 69. This test is carried out by applying the sharpened point of pencils of various degrees of hardness from soft to hard ranging from 2B, B, HB, F, H, 2H, 3H, etc. to 9H. The hardness index is determined from the numbered pencil which first showed a visible mark on the surface of the test film. As indicated, the hardness of the polyurethane plastic material of our invention had a hardness of 3H–2H, whereas a similar film pressed from a polyurethane prepared from 1,6-hexanediamine and the above bischloroformate had a hardness index by this same test of only B–2B. It is thus clear that the above novel polyurethane of the present invention has a surface hardness very much greater than the prior art product.

*Example 2*

Following the procedure of Example 1, a polyurethane was prepared from 2,5-norbornanediol bischloroformate. The diol from which this bischloroformate was prepared is described and claimed in our copending application Serial No. 843,926, filed October 2, 1959, entitled "Linear Polyurethanes from Norcamphanediols and Norcamphanediol Bischloroformates." The polymer melted at 240–250° C. and had an inherent viscosity of 0.87. Its hardness index was 4H–3H.

*Example 3*

Following the procedure of Example 1, a polyurethane was prepared from a 2,5(or 2,6)-norbornanedimethanol bischloroformate. The synthesis of the diol from which this bischloroformate was prepared is given in British Patent 766,666. The polymer melted at 210–230° C. and had an inherent viscosity of 0.67. Its hardness index was 4H–3H.

*Example 4*

A polyurethane was prepared from the bischloroformate of trans-1,4-cyclohexanediol according to the method of Example 1. It melted at 220°–230° C., had an inherent viscosity of 0.72, and a hardness index of 3H–2H.

*Example 5*

A polyurethane was prepared from 1,6-hexanediol bischloroformate according to the procedure of Example 1. It melted at 170°–180° C., had an inherent viscosity of 0.91 and a hardness index of 2H–H.

*Example 6*

A polyurethane was prepared from the bischloroformate of 2,5-dimethylhydroquinone according to the procedure of Example 1. It melted at 200°–220° C., had an inherent viscosity of 0.56 and a hardness index of 3H–2H.

*Example 7*

A polyurethane was prepared from the bischloroformate of 2,2,4,4-tetramethyl-1,3-cyclobutanediol according to the procedures of Example 1. The bischloroformate is described and claimed in our copending application Serial No. 24,247, filed April 25, 1960. The polymer melted at 260–280° C., had an inherent viscosity of 0.84 and a hardness index of 3H–2H.

By following the procedures of the above examples other polyurethanes and copolyurethanes may be prepared from the norbornanebis(methylamines) and any of the mentioned diol bischloroformates and other bischloroformates that are suitable for replacing part of the diol bischloroformate. The products have properties generally similar to those of the products described in the examples. The products of the invention are thermoplastic and on melting give homogeneous clear dopes which can be readily converted by melt-spinning to fibers, by injection molding to shaped articles, and by extrusion to clear flexible sheets and films. The latter products are useful, among other things, for photographic film supports. The shaped articles, sheets, and films are particularly valuable because they have very hard surfaces which are resistant to scratching, scuffing, and denting when subjected to contact or impact with hard objects. If desired, various fillers, pigments, dyes, lubricants, plasticizers, etc., can be incorporated into the polyurethane products of the invention.

The invention has been described in detail with particular reference to preferred embodiments thereof, but it will be understood that variations and modifications can be effected within the spirit and scope of the invention as described hereinabove and as defined in the appended claims.

We claim:

1. A resinous polyurethane substantially composed of the following repeating units:

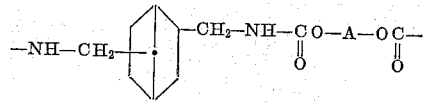

wherein A represents a radical selected from the group consisting of divalent straight-chain alkylene radicals of 2–20 carbon atoms, divalent branched-chain alkylene radicals of 2–20 carbon atoms, phenylene, xylylene, and divalent alicyclic radicals selected from the group consisting of cyclohexylene, cyclohexylenedimethylene, norbornylene, norbornylenedimethylene and 2,2,4,4-tetramethylcyclobutylene.

2. A polyurethane as defined by claim 1 wherein A is a 1,4-cyclohexanedimethylene radical.

3. A polyurethane as defined by claim 1 wherein A is a 2,5-norbornylene radical.

4. A polyurethane as defined by claim 1 wherein A is a 2,5-dimethyl-1,4-phenylene radical.

5. A polyurethane as defined by claim 1 wherein A is a 2,2,4,4-tetramethyl-1,3-cyclobutylene radical.

6. A polyurethane as defined by claim 2 wherein A is in the form of the trans isomer.

References Cited by the Examiner

UNITED STATES PATENTS

| | | | |
|---|---|---|---|
| 2,666,748 | 1/54 | Arthur | 252—438 |
| 2,708,617 | 5/55 | Magat | 260—77.5 |
| 2,800,464 | 7/57 | Miller | 260—77.5 |
| 2,900,368 | 8/59 | Stilmar | 260—77.5 |
| 2,926,145 | 2/60 | McConnell | 260—77.5 |
| 2,952,666 | 9/60 | Coover | 260—77.5 |

OTHER REFERENCES

Noller: "Chemistry of Organic Compounds," 2nd ed. © 1957, pages 103 and 262.

Merck Index, 7th ed. © 1960, page 1412.

LEON J. BERCOVITZ, *Primary Examiner.*

DONALD E. CZAJA, *Examiner.*